G. S. RIGGS.
ELECTRIC TRAP.
APPLICATION FILED MAR. 24, 1908.

913,053.

Patented Feb. 23, 1909.
2 SHEETS—SHEET 1.

Witnesses
J. Adolph Bishop
E. L. Chandlee

Inventor
George S. Riggs,
By Woodward & Chandlee
Attorney

G. S. RIGGS.
ELECTRIC TRAP.
APPLICATION FILED MAR. 24, 1908.

913,053.

Patented Feb. 23, 1909.
2 SHEETS—SHEET 2.

Witnesses
J. Adolph Bishop
E. L. Chandler

Inventor
George S. Riggs,

By Woodward & Chandler
Attorney

UNITED STATES PATENT OFFICE.

GEORGE S. RIGGS, OF MABLE, OREGON.

ELECTRIC TRAP.

No. 913,053.    Specification of Letters Patent.    Patented Feb. 23, 1909.

Application filed March 24, 1908. Serial No. 423,030.

*To all whom it may concern:*

Be it known that I, GEORGE S. RIGGS, a citizen of the United States, residing at Mable, in the county of Lane and State of Oregon, have invented certain new and useful Improvements in Electric Traps, of which the following is a specification.

This invention relates to traps, and more particularly to traps suitable for catching rats and similar rodents, and has for its object to provide an electrical means for killing such animals.

Another object is to provide a structure having mechanism arranged for removing the bodies of electrocuted animals.

Another object is to provide such a trap which will always be ready for operation.

Another object is to provide such a trap which will be arranged to break the electrical circuit connected therewith, after each operation of the trap and which will complete the circuit when a rodent enters the trap.

Other objects and advantages will be apparent from the following description, and it will be understood that changes in the specific structure shown and described may be made within the scope of the claims and that any suitable materials may be used without departing from the spirit of the invention.

Figure 1:
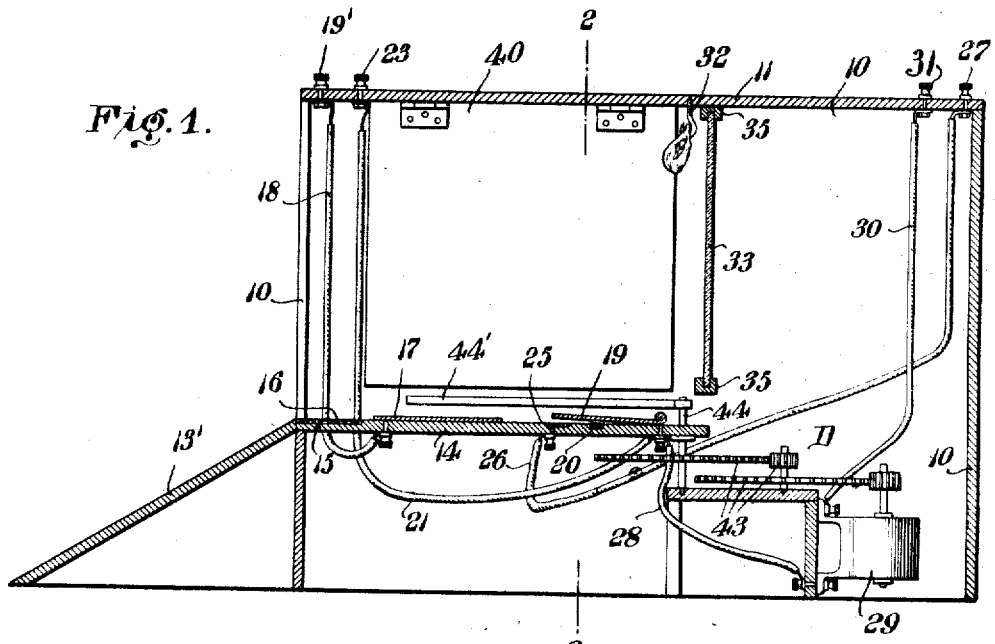
Figure 2:
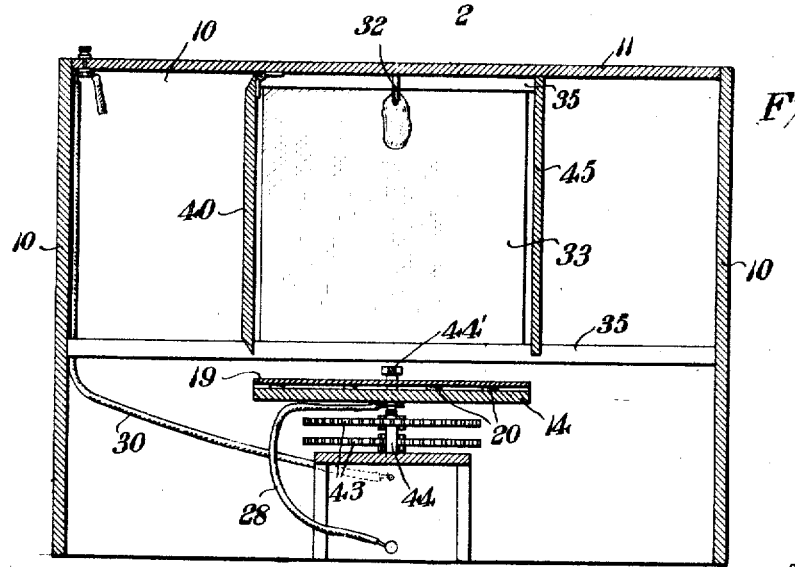
Figure 3:
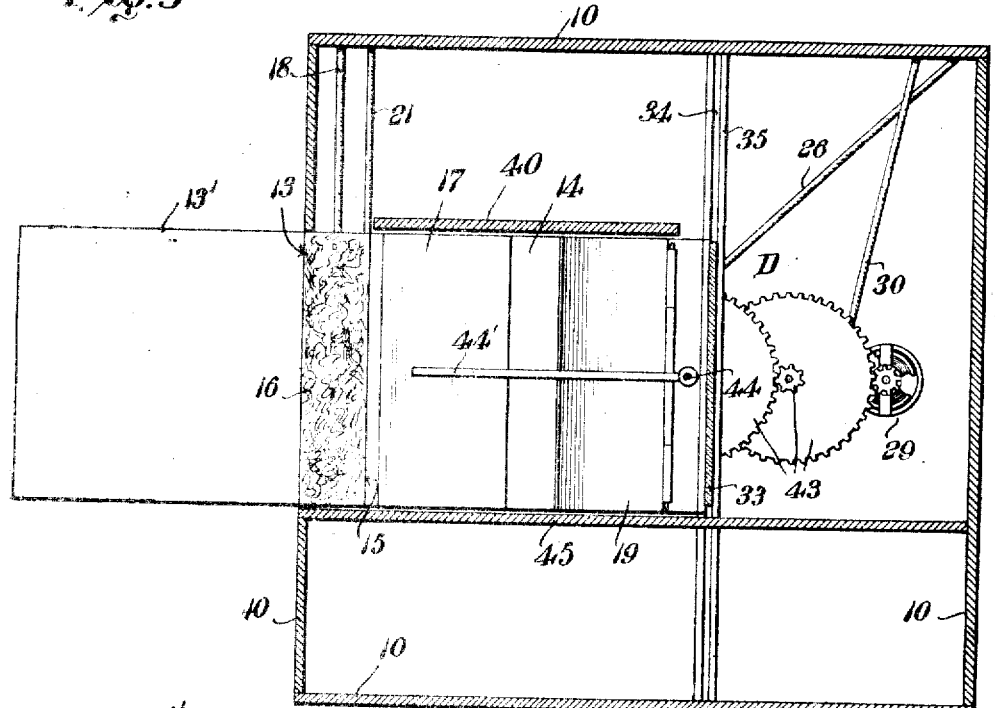
Figure 4:
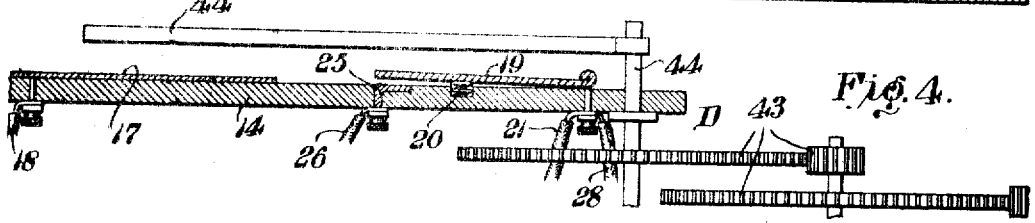
Figure 5:
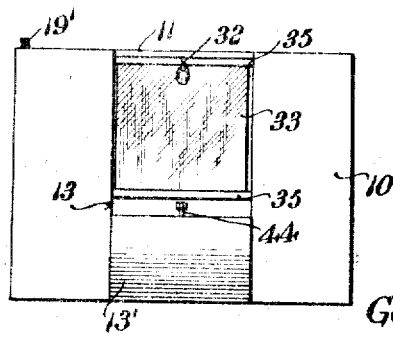

In the drawings forming a portion of this specification, and in which like numerals of reference indicate similar parts in the several views, Figure 1 is a sectional view of the trap laterally therethrough, Fig. 2 is a cross sectional view of the trap, Fig. 3 is a horizontal sectional view of the trap, Fig. 4 is a detail sectional view through the clearing mechanism and electrocuting means, Fig. 5 is a front view of the trap.

Referring to the drawings, there is shown a trap comprising a box portion having walls 10, roof portion 11 a door 13 located midway of one of the walls, and an inclined entrance board 13'. Midway of the box portion there is a horizontal platform 14 located centrally of the box and extending rearwardly from the door 13 with its edges in spaced relation with the adjacent walls 10. Inwardly of the door 13 the platform 14 is recessed the width of its upper face as shown at 15, and a porous fabric 16 is embedded in the recess, said fabric being intended to be saturated with water, to moisten the feet of a rodent stepping thereon, the purpose of which moisture will be subsequently indicated.

Inwardly of the recess 15 there is a metallic conductor plate 17 secured upon the platform 14, said plate extending inwardly half the length of the platform 14 and having connected thereto a wire 18 leading to a binding post 19' located in the top portion 11 of the box, as shown.

Pivoted at the rear portion of the platform 14 there is a plate 19 extending forwardly from its pivot and having its free edge disposed in spaced relation with the rear edge of the plate 17, being held yieldably slightly above the platform 14 by means of springs 20 disposed thereunder at its opposite sides. A wire 21 is attached to the plate 19 and leads to a binding post 23 engaged in the roof portion 11 adjacent to the post 19'. It will be seen that when the binding posts 19' and 23 are connected with the opposite poles of an electrical circuit, any rodent entering the trap will traverse the fabric 16, its feet thus being dampened, and upon placing its fore feet upon the plate 19, its rear feet being upon the plate 17, an electrical current will pass through the body of the animal and accomplish its death, if the strength of the current be sufficient. Disposed beneath the free edge of the plate 19 there is a contact plate 25 having a wire 26 connected therewith and extending to a binding post 27 located in the roof 11 of the box. A wire 28 is secured to the plate 19 and extends therefrom to one pole of a motor 29 arranged in engagement with a clearing mechanism subsequently to be described. A wire 30 is carried from the opposite pole of the motor to a binding post located adjacent to the binding post 27, as shown. A bait hook 32 is suspended from the roof 11 inwardly of the box and over the inner end of the platform 14, behind which there is located a vertical mirror 33 extending across the rear of the platform 14, as shown. The mirror is held by engagement in grooves 34 formed in strips 35 one of which is secured upon the inner portion of the roof 11 and the other supported at its ends upon the adjacent walls 10.

A pendent swinging door 40 is pivoted to the roof portion 11 extending longitudinally of the trap, its lower edge being in spaced relation with one longitudinal edge of the platform 14. A clearing mechanism D is located beneath the platform 14, and comprises a base member supporting a motor 29 engaged with a series of gears 43 operating a shaft 44 extending vertically adjacent to the inner end of the platform 14, with its end portion slightly above said platform. A clearing arm 44' extends horizontally from the upper end of the shaft 44, and is arranged to move laterally across the platform 14 and close to the surface, therefore when the shaft 44 is rotated, to sweep any object lying thereupon beneath the swinging door 40 which object thus falls into the space between the platform and the adjacent side wall 10. A partition 45 is secured within the box adjacent to the opposite edge of the platform 14, the lower edge of the partition being spaced above the platform 14 to allow the passage thereunder of the clearing arm 44.

It will be seen that a rodent entering the door 13 will have its image reflected in the mirror 33, which will seem like another animal and thus reassure the one entering. Crossing the fabric 16 the feet of the animal will become wetted thus making an effective contact upon the plates 17 and 19. As the animal steps upon the plate 19 it will receive the force of any current which may be transmitted thereto by means of the wires 18 and 21, the shock of which if sufficiently severe will kill the animal. The weight of the animal upon the plate 19 will press that plate downwardly into contact with the plate 25, thus completing a circuit between the motor 29 and the binding posts 31 and 27 so that when proper connections are made between said posts and an electrical source, the clearing mechanism D will be operated. The clearing arm 44' will thus be brought to bear against the carcass so as to pass it through the swinging door 40 over the adjacent edge of the platform 14 into the space therebeneath.

What is claimed is:—

1. In an animal trap comprising a housing having a door therein and a floor inwardly of said door, a contact plate located inwardly of said door, a second contact plate spaced inwardly of said first named plate, a pivoted plate disposed in yieldable spaced relation over said second named plate, a motor carried by said trap, a rotating arm disposed to sweep closely over said first named plate and said pivoted plate, operative connections between said motor and said arm, series electrical connections between said pivoted plate, said second named plate and said motor, series electrical connections between said first named plate and said pivoted plate, said pivoted plate being adapted to be depressed by the weight of an animal against said second named contact plate, and a foot moistening means disposed outwardly of said first named plate.

2. An article of the class described comprising a chamber member, said chamber member comprising a front portion having a door formed therein, rear and side walls, base and roof portions, said chamber member having secured therein midway of its height a platform extending inwardly of said chamber member from said door, the sides of said platform being in spaced relation with said side portions, a recess extending laterally across said platform adjacent to said door, moist material contained in said recess, a plate secured to said platform inwardly of said recess, a second plate secured pivotally to the inner edge of said platform, the opposite edge of said last named plate being held yieldably in spaced relation above said platform, positive and negative electrical connections respectively with said plates, a contact plate disposed beneath said second named plate, positive and negative connections with said second named plate and said contact plate respectively, a motor in circuit with each of said last named plates, said second named plate being arranged to be depressed into contact with said contact plate under the weight of an animal to close an electrical circuit through the said motor, a vertical shaft revolubly mounted at the inner end of said platform and having its upper end portion extending slightly above the platform, a clearing arm secured to said shaft and arranged to swing across said platform in close proximity to the surface thereof under rotation of said shaft, operative connections between said shaft and said motor, a pendent door pivoted to the roof portion, vertically above one of the side edges of said platform, the lower edge of said pendent door being disposed in spaced relation with the adjacent edge of the platform, a vertical mirror extending laterally of said platform at its inner end, and a bait holding means located above said platform.

3. The combination with an animal trap of spaced contact plates and a pivoted plate disposed in yieldably spaced relation over the adjacent contact plate and adapted to be depressed into engagement therewith by the weight of an animal thereupon, a carcass removing mechanism carried by said trap, series electrical connections between said pivoted plate, and the adjacent contact plate and said carcass removing mechanism, and series connections between said pivoted plate and the other of said contact plates.

In testimony whereof I affix my signature, in presence of two witnesses.

GEORGE S. RIGGS.

Witnesses:
CARL E. FISCHER,
J. S. CHURCHILL.